Dec. 29, 1942.                C. W. ELLSON                2,306,598
                       REPLACEABLE BIT ROCK DRILL
                        Filed May 5, 1938          2 Sheets-Sheet 1
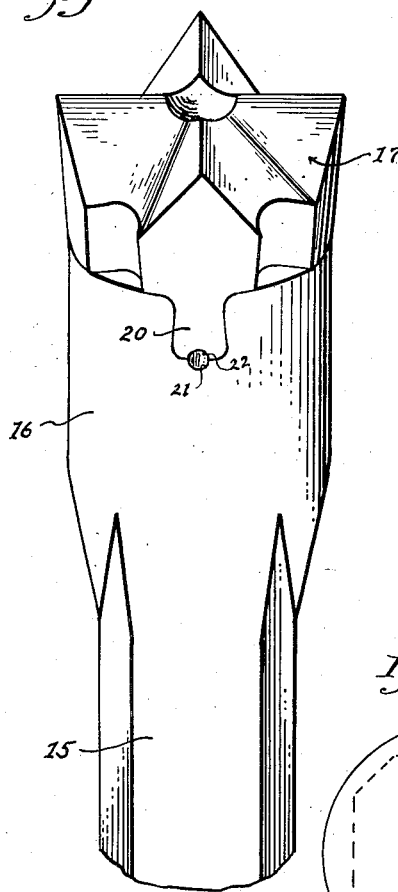
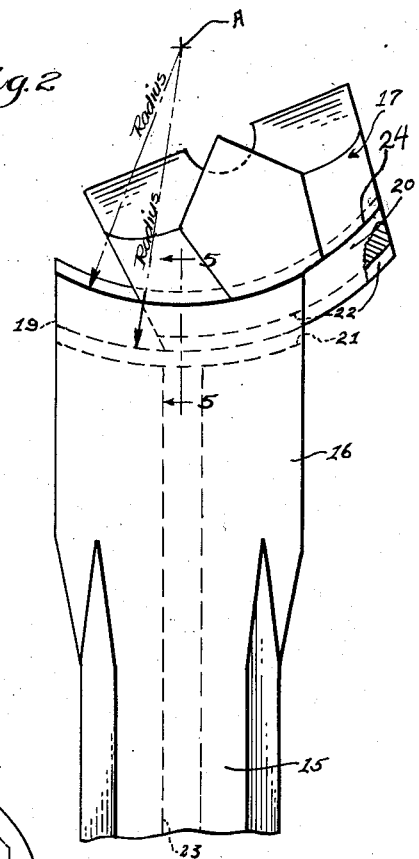
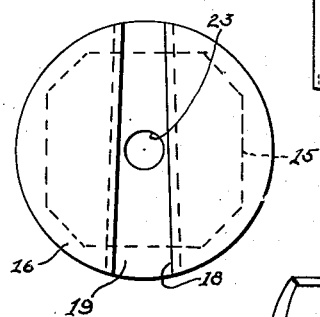
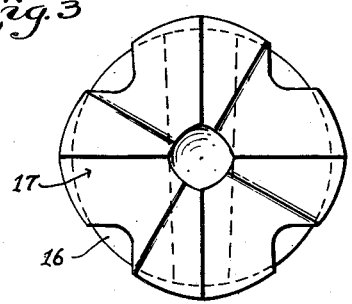
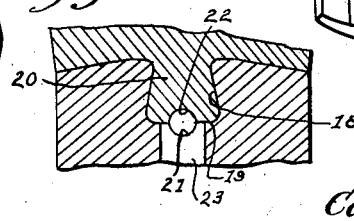
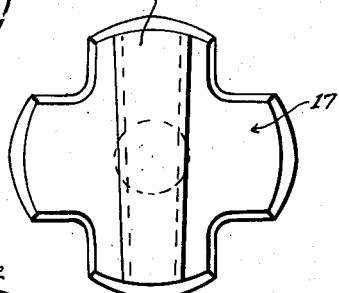
INVENTOR.
Carl W. Ellson
BY
Barnes, Kisselle, Laughlin & Raisch
ATTORNEYS Dec. 29, 1942.  C. W. ELLSON  2,306,598
REPLACEABLE BIT ROCK DRILL
Filed May 5, 1938  2 Sheets-Sheet 2
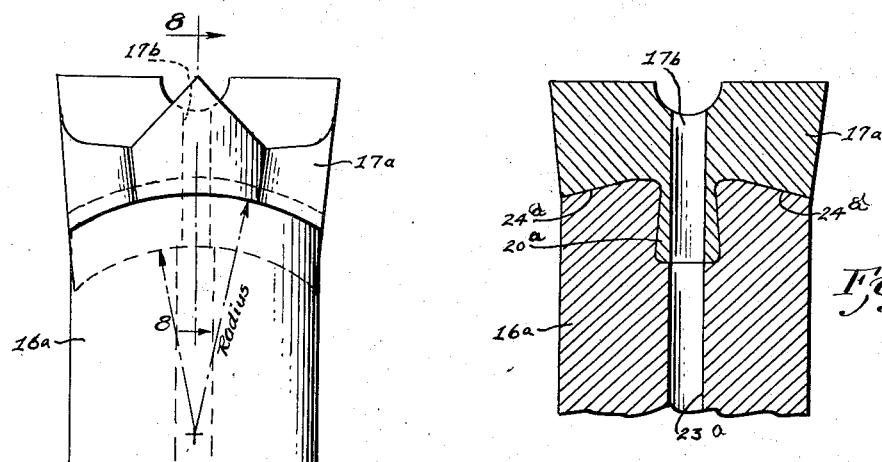
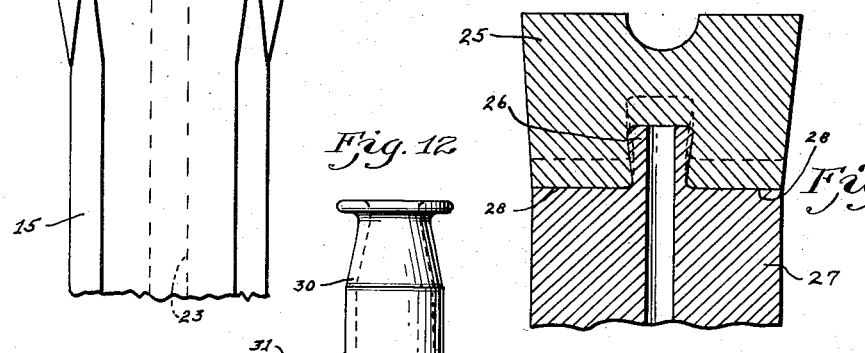
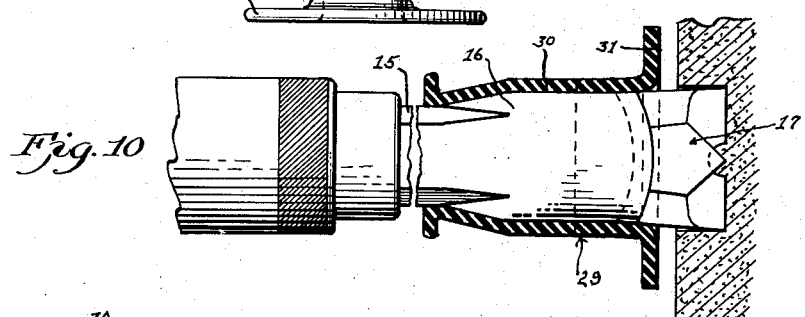
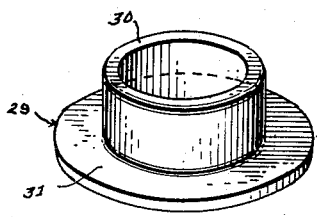
INVENTOR.
Carl W. Ellson
BY
Barnes, Kisselle, Laughlin & Raisch
ATTORNEYS Patented Dec. 29, 1942

2,306,598

UNITED STATES PATENT OFFICE 2,306,598

REPLACEABLE BIT ROCK DRILL

Carl W. Ellson, Detroit, Mich., assignor to Ray E. Townsend, Ann Arbor, Mich.

Application May 5, 1938, Serial No. 206,231

6 Claims. (Cl. 255—64)

This invention relates to improvements in rock drill shanks and replaceable bits therefor.

More particularly this invention relates to equipment for rock drilling including drill shanks, replaceable bits therefor, and guards for operators. Rock drilling in mining and subway work is usually accomplished by the use of a drilling bar which has one end provided with a drill bit, the assembly being subjected to a simultaneous rotary and hammering movement. It is well known to those familiar with the art that drilling equipment of the type described, consists of a pneumatic piston and cylinder mechanism associated with so-called drill steel or bit and adapted to impart short blows to the steel in extremely rapid succession. The apparatus also includes ratchet means for rotating the drill steel during the operation of the apparatus. The conventional type of drill steel or drill rod is made in various shapes, usually octagonal or hexagonal, and is provided with a bit-holding nose or shank portion shaped by deforming or upsetting the end of the rod.

In previous bit and shank designs it has been customary to provide the shank end with a straight dovetail slot and the bit with a longitudinal dovetail portion for fitting in said slot. Difficulty has been had in providing a proper contact surface between bit and shank since the constant hammering has caused the dovetail portions of the bit to upset in the slots and this tends to spread and split the shank portions. In some cases an attempt was made to form the base of the slot of harder metal to stand this shock.

The old dovetail bits have also been at fault because of a dragging effect wherein the bit rides partially out of the slot and off-center so that a hole is drilled which is untrue and larger than the diameter of the bit. Other disadvantages have been that the operators have had difficulty in keeping bits in the driving shanks when first inserting the drill into the starting hole, since a bit sometimes accidentally drops unnoticed from the shank and the operator proceeds to drill with the shank alone.

An object of the present invention is to provide a detachable bit and shank therefor, so designed that the bit will automatically tend to ride centered on the shank regardless of whether the hole is drilled at an angle to the face of the rock or perpendicular thereto.

Another object is to provide a bit and shank designed such that the bit may be easily retained in the shank in starting a hole and a bit which is provided with a shock surface, other than the dovetail connection so that the bit will not tend to split the shank bars.

A further object is to provide a bit which need not be provided with a central conical tap for centering the bit when starting a drill.

An additional object of the present invention is to provide a guard means which aids to hold the bit in place when starting a hole and which obviates the necessity for protecting goggles and gloves for a drill operator.

A still further object is to provide a guard means which enables compressed air to be used conveniently in the blowing out of a hole. In this way a hole can be kept free of drillings and the drilling speed may be increased.

Other features and objects of the invention having to do with detail of design and fabrication, including the provision of watergrooves, will be specifically brought out in the following description and claims.

Certain modifications of the invention are illustrated for purposes of exemplification in the following drawings:

Fig. 1 is a perspective view of a rock drill shank showing the relationship of the replaceable bit thereto.

Fig. 2 is a side view of the same showing a bit partially out of engagement with the shank.

Figs. 3 and 4 are end views of the bit.

Fig. 5 is a section taken on the lines 5—5 of Fig. 2.

Fig. 6 is an end view of the drill shank.

Fig. 7 is a side view of the modification of the invention.

Fig. 8 is a section taken on the lines 8—8 of Fig. 7.

Fig. 9 is a sectional view of the modification of the invention illustrating a reversal of the dovetail portions.

Fig. 10 is a sectional view of an assembly of the shank and bit showing the relationship of the retaining guard thereto.

Figs. 11 and 12 illustrate modifications of the retaining guard.

In Fig. 1, a drill shank is shown at 15 having end portions which are upset, as indicated at 16, to provide a large enough diameter to give sufficient strength to that portion of the shank with which the bit is engaged and to leave sufficient clearance between the drill hole and the main body of the shank 15. The upset portion 16 of the shank is long enough to stop the drill from creeping to one side when the bit enters a soft layer of rock at an angle, the length being such that it will guide the bit until it is wholly within the softer rock or vice versa. A bit 17 is shown in drilling position at the end of the upset portion of the shank 16.

In Fig. 2 a bit is shown partially in engagement with the drill shank 16. The end of the portion 16 of the shank is provided with a concave curve as shown, the curve being a portion of the arc of a circle having a center A located on the axis of the shank. A dovetail slot 18 is formed transversely of the shank portion 16, Fig. 6, and is provided with a base portion 19 which is curved on a radius as is the end face of the shank, that is, as the arc of a circle having a center at A. The dovetail slot 18 is also provided with a taper, as shown in Fig. 6. The bit 17 has a convex back face which is formed complementally to the concave end of the shank. The bit 17 is also provided with a dovetail portion 20 which is curved convexly and tapered to fit the slot 18. The base 19 of the slot 18 is provided with a longitudinally extending groove 21 which passes from one end of the slot to the other. A corresponding groove 22 is formed in the dovetail portion 20 of the bit so that a substantially round passageway is formed through the assembly. In the shank 15 is a hole 23 provided as a water passageway.

In Figs. 7 and 8, a modification of the invention is shown in which the end of the shank 16a is formed with a convex radius and the end of the bit 17a is formed with a concave radius. The dovetail slot 18a and portion 20a in each case is formed in a corresponding manner with an arc having a center identical with that of the arc on the shank and bit respectively. The bit to be used with this modification is preferably formed with an axial hole 17b to register with a hole 23a.

Referring to Figs. 5 and 8, which are sections of Figs. 2 and 7, it will be seen that the bits 17 and 17a are provided with slightly tapering shoulders 24 and 24a which taper back from the foot of the dovetail portions 20 and 20a, respectively. In Fig. 9 I have shown a modification in which the dovetail slot is provided in a bit 25 and a dovetail portion is provided at the end of a shank 27. In this modification I have shown the shoulders of the bit 28 as extending straight out from the center. The bit and shank are, however, still provided with the curved contour or radius as described in connection with Fig. 2.

The modification of the drill and shank shown in Figs. 1 and 2, is especially useful for starting a hole. Considerable difficulty has been experienced in the past in keeping a replaceable bit in the dovetail slot when the hole is being started. It has been customary for the operator to slide the bit portion in the slot and then to raise the combination and start the drill at the proper position. In some cases, however, the drill has fallen unnoticed from the shank and the end of the shank has been badly damaged. This is true whether a drill is being replaced or a hole is being started. With the tapered slot 18, as above described, it is possible for the operator to insert the drill in the shank and to hold the shank in such a position that the narrow portion of the slot is down. With such an arrangement there is no danger of the drill or bit portion 17 dropping from the shank.

It has also been difficult in the past to keep a bit centered in a shank when a hole is being started. It is clear that with a straight dovetail the rotating and percussion action will tend to jar the bit from the retaining slot. With the present invention the bit will automatically tend to center itself due to the fact that the abutting ends of the shank and bit are formed with a radius as described. The bit will no longer tend to drag from the slot and it is not necessary to provide a conical hole in the face end of the bit as has been done in some cases to aid in starting.

An axial hole is usually provided in a drill shank and bit to permit the passage of water. Water is furnished to this axial passageway under pressure of 40 to 50 pounds and in some cases, compressed air may be used. Difficulty arises when the water or compressed air discharges around the drilling shank at the entrance to the hole being drilled since the discharging fluid tends to carry drillings and bits of rock into the eyes and hands of the operators.

In Fig. 10, I have shown a cross section of a guard 29 which may be used to afford protection for a drill operator and to obviate the necessity for gloves and goggles which must otherwise be worn. This guard 29 is preferably formed of a resilient material such as rubber and is formed in the shape of a sleeve 30 having a radially extending portion 31. Fig. 11 is a perspective of a modification of the guard sleeve and Fig. 12 is a side view of the guard shown in section in Fig. 10.

The sleeve portions of these guards 29 are preferably formed of resilient and elastic materials since they may then be stretched over the enlarged upset portion 16 of the shanks and will later ride back on the smaller portions 15 and still be held with considerable friction against slipping on the shank.

When the guard is slipped over the assembled shank and bit as shown in Fig. 10, it will serve to hold these two dovetail members in assembled relationship while the hole is being started. In addition, the portion 31 will prevent the rock chips or drillings from flying back at the operator when the compressed air or water is used to flush out the hole being drilled. As the drilling proceeds the guard 29 will be forced back on the shank 15 and will always be close to the opening of the drilled hole so that it will consequently serve as a guard or deflector.

The arrangement which I have shown in Figs. 1 and 2 is especially adapted for use with a transverse water groove 21—22 through the retaining slot since it will be seen that the groove is so shaped that water will be forced to the front of the bit. With previous constructions these transverse grooves have been provided but they have not been entirely satisfactory since there has been too much pressure loss by reason of the water impinging directly on the walls of the drill hole.

What I claim is:

1. In a rock-drilling combination, a shank member having a main fluid passageway and a convex end portion curved on a radius centered on the axis of said shank, a bit member having an end portion complemental to said curved shank end, one of said members being provided with a dovetail slot curved to correspond with said end curves, and a dovetail portion on the other of said members adapted to engage said dovetail slot, one of said members having a transverse fluid groove open to said main passageway.

2. In a rock-drilling combination, a shank member having a concave end portion curved on a radius having a center on the axis of said shank and provided with a main fluid passageway and a transverse dovetail slot curved to correspond with said end curve, said slot having a base provided with a water groove extending substantially longitudinally thereof to the sides of said shank, and a bit member having an end portion and a dovetail portion curved complementally to said curved shank end.

3. In a rock-drilling combination, a shank member having a concave end portion curved on a radius having a center on the axis of said shank and provided with a main fluid passageway and a transverse dovetail slot curved to correspond with said end curve, and a bit member having an end portion and dovetail portion curved complementally to, and adapted to engage, said curved shank end, said dovetail slot and said dovetail portion each having a fluid groove extending longitudinally thereof and mutually registering to provide a transverse curved fluid groove in said combination.

4. In a rock-drilling combination, a shank member having a curved end portion, a bit member having an end curved complementary to said shank end, one of said members being provided with a dovetail slot curved similarly to said curved ends and tapering inwardly and along the longitudinal axis of the slot, and a curved dovetail portion on the other of said members adapted to engage said dovetail slot, said dovetail portion having a taper to correspond to the taper of said slot.

5. The combination of a rock drill shank member having a curved end portion, a bit member having an end curved complementary to said shank end, one of said members being provided with a dovetail slot curved similarly to said curved ends, and a curved dovetail portion on the other of said members adapted to engage said dovetail slot of and a guard means comprising a rubber sleeve member and a radially extending flange thereon adapted to slip over said bit and shank to hold said members in assembled relation and to further serve as a guard for a drill operator.

6. The combination with a drill shank having a main water duct extending longitudinally therethrough and a diametric dovetail slot in the operating end thereof, and a bit having a portion fitting said slot, of a guard means comprising a sleeve member and a radial portion extending therefrom, said sleeve being adapted to slip over said drill bit and shank to hold the same in assembled relation and adapted to slip back upon said shank as drilling proceeds.

CARL W. ELLSON.